United States Patent Office 3,558,703
Patented Jan. 26, 1971

3,558,703
CATALYTIC HYDROGENATION OF DIAMINODI-
PHENYL ALKANES OR ETHERS
Karl Adam, Erich Haarer, Karl Merkel, and Kurt Pilch,
Ludwigshafen (Rhine), Germany, assignors to Badische
Anilin- & Soda-Fabrik Aktiengesellschaft, Ludwigshafen
(Rhine), Germany
No Drawing. Filed Mar. 1, 1967, Ser. No. 619,598
Claims priority, application Germany, Mar. 9, 1966,
P 15 68 087.2; Aug. 20, 1966, P 15 68 164.8;
Sept. 30, 1966, P 15 68 188.6
Int. Cl. C07c 85/14
U.S. Cl. 260—563                             7 Claims

ABSTRACT OF THE DISCLOSURE

A process for the catalytic hydrogenation of diaminodiphenyl alkanes or ethers, which may be substituted in the nuclei or on nitrogen, in the presence of hydrogenation catalysts, particularly those containing cobalt and manganese. Hydrogenation is carried out in the absence of alkaline earth metal oxides at temperatures of 140 to 300° C. and pressures of 150 to 700 atmospheres. Cyclic ethers having an oxygen atom in the ring, or cyclohexylamine which may be substituted on the nitrogen atom, are used as solvents. The solvent concentration is 30 to 90% by weight based on the total of solvent and compound to be hydrogenated. Diaminodicyclohexyl alkanes or ethers are suitable for the production of high polymers.

---

This invention relates to a process for the catalytic hydrogenation of diaminodiphenyl alkanes or ethers in the presence of solvents.

It is known from U.S. Pat. 2,606,927 that diaminodiphenyl alkanes can be hydrogenated in the presence of ethers, such as dioxane, and cobalt or nickel catalysts. The yields obtainable by this process are however unsatisfactory. According to another process (German Pat. 888,767) good yields are obtained in the hydrogenation of 4,4-diaminodiphenylmethane by using ruthenium catalysts in the presence of dioxane. Ruthenium catalysts are however not very suitable for industrial purposes as they are very expensive. It is furthermore known (German Pat. 842,200) that hydrogenation of 4,4-diaminodiphenylmethane gives high yields when using cobalt or nickel catalysts in the presence of hydrophobic solvents and alkaline earth metal oxides.

This process is unsuitable for continuous operation as the catalyst mass cakes after a short period, thus losing its activity.

It is an object of the present invention to provide a process in which diaminodiphenyl alkanes or ethers are hydrogenated in the phenyl nuclei to the corresponding cyclohexyl compounds using catalysts that are easy to handle even on a commercial scale and are not expensive. Another object of the invention is to provide a process which uses catalysts having a long life and which gives high yields.

In accordance with this invention these and other objects and advantages are achieved by contacting diaminodiphenyl alkanes or ethers with hydrogen in the presence of hydrogenation catalysts and inert solvents at elevated temperature and under superatmospheric pressure in the absence of alkaline earth metal oxides, the inert solvents being cyclic ethers having one oxygen atom in the ring, cyclohexylamine or N-alkylated cyclohexylamines in concentrations of from 30 to 90% by weight based on the total of solvent and compound to be hydrogenated.

The excellent results obtainable by the new process are surprising in that it is stated in German Pat. 842,200 that hydrophilic solvents, such as tetrahydrofuran, will reduce the yields when using alkaline earth metal oxides, and J.A.C.S., vol. 75, 1156 (1953) states that hydrogenation of diaminodiphenylalkanes will give good yields only in the presence of alkaline earth metal oxides.

Prefered diaminodiphenyl alkanes or ethers have the general formula

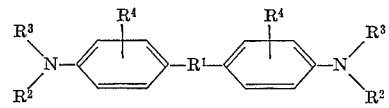

where $R^1$ is an alkylene or alkylidene radical having from 1 to 4, preferably from 1 to 3, carbon atoms, or an oxygen atom, $R^2$ and $R^3$ are hydrogen atoms or alkyl radicals having from 1 to 4 carbon atoms, especially hydrogen atoms, and $R^4$ is a hydrogen atom, an alkyl radical having from 1 to 12, preferably 1 to 4, carbon atoms, a halogen atom, or an alkoxy radical which contains 1 to 4 carbon atoms. Examples of compounds that are suitable for hydrogenation are 4,4'-diaminodiphenylmethane,
4,4'-diamino-2,2'-didodecyldiphenylmethane,
N,N'-dibutyl-4,4'-diaminodiphenylmethane,
4,4'-diaminodiphenylpropane-(1,3),
4,4'-diaminodiphenylbutane-(1,4),
4,4'-diaminodiphenylpropane-(2,2),
2,2'-diaminodiphenylmethane,
2,4'-diaminodiphenylmethane,
4,4'-diamino-2,2'-dichlorodiphenylpropane-(2,2),
2,2'-diamino-5,5'-dimethoxydiphenylmethane and
N,N'-dimethyl-4,4'-diaminodiphenyl ether.

The process is particularly important for the hydrogenation of 4,4'-diaminodiphenylmethane and 4,4'-diaminodiphenylpropane-(2,2).

It is preferred to use the conventional readily available hydrogenation catalysts such as copper, chromium, manganese, tungsten, molybdenum, cobalt or nickel or mixtures thereof. Very good results are obtained by using cobalt and nickel catalysts. Hydrogenation catalysts which contain cobalt and manganese give particularly good results. The catalysts advantageously contain 1 to 99.5%, preferably 15 to 95%, by weight of cobalt and 0.1 to 50%, preferably 1 to 20%, by weight of manganese, based on the metal content of the catalyst. In addition, the catalysts may contain other metals, e.g. copper, chromium, nickel, tungsten, molybdenum, platinum, palladium or ruthenium, in amounts of up to 10% by weight.

The catalyst may be used unsupported. In this case, the individual components of the catalyst are mixed in the form of compounds that can be reduced with hydrogen at elevated temperatures, such as oxides, hydroxides, oxalates, ammoniates, formates or nitrates, shaped, for example into pellets or tablets, if desired heated for some time, advantageously at 300 to 1000° C., and then reduced with hydrogen, advantageously at 200 to 400° C. In order to obtain a specific pore size, the catalyst may again be heated to 400 to 1000° C. It is also possible to apply the metal compounds to carriers, such as fuller's earth, pumice, pelleted silicic acid, silica gel, aluminum oxide or silicates, followed by heating to 300 to 1000° C., e.g. in a muffle furnace, and reduction with hydrogen as described above. The metal content of the supported catalysts is usually between 5 and 50% by weight.

Hydrogenation may for example be carried out at pressures of 150 to 700, preferably 200 to 350, atmospheres. In general, temperatures of 140 to 300° C. are used. Particularly good results are achieved at temperatures of 180 to 250° C.

The preferred cyclic ethers that are used as solvents have 1 oxygen atom and 4 to 8 carbon atoms both in the molecule and in the ring and, apart from the oxygen atom, have saturated hydrocarbon structure. Cyclic ethers having a five- to seven-membered ring are particularly preferred. Examples of suitable cyclic ethers are tetrahydrofuran, tetrahydropyran, hexamethylene oxide, 2 - methyltetrahydropyran and 2,4-dimethyltetrahydrofuran. Particularly good results are obtained by using tetrahydrofuran or hexamethylene oxide as solvent.

Particularly good results are also obtained by using cyclohexylamine as solvent. Preferred N-alkylated cyclohexylamines are those which are substituted on the nitrogen atom by one or two alkyl groups having from 1 to 4 carbon atoms, e.g. ethyl, methyl, isopropyl or butyl radicals. Examples of suitable compounds are N-methylcyclohexylamine, N,N-diethylcyclohexylamine, N-methyl-N-butylcyclohexylamine and N-isopropylcyclohexylamine. It is particularly advantageous to use as the solvent a mixture of the said cyclic ethers or cyclohexylamines and reaction product. The solvents used need not be absolutely anhydrous, hydrogenation giving excellent yields even with low water contents, e.g. up to 2% by weight on the solvent. Mixtures of the said solvents may also be used.

The solvents are used in concentrations of 30 to 90% by weight, based on the total of solvent and compound to be hydrogenated. It is advantageous to use 60 to 80% by weight of solvent. Up to 20% by weight, based on the solvent, of ammonia or of the amine corresponding to the amino group attached to the benzene nuclei may be added to the solvent.

The process of this invention may for example be carried out by pressuring hydrogen under the temperature and pressure conditions specified into an autoclave which contains a diaminodiphenyl alkane or ether, the said amount of solvent and a suspension of one of the said catalysts. The process may also be carried out continuously by passing hydrogen, a diaminodiphenyl alkane or ether and one of the said solvents under the temperature conditions specified, either upwardly or downwardly through a vertically arranged high-pressure tube which contains a catalyst which is supported on a granular carrier and may have been previously reduced with hydrogen.

In a particular advantageous embodiment of the continuous method described the solvent content is kept constant during hydrogenation by continuously making up the solvent discharged together with the excess hydrogen, or preferably by recycling the excess hydrogen laden with solvent vapor after adding make up hydrogen according to the amount consumed, care being taken to ensure that the temperature of the cycle hydrogen does not fall to more than 60° C. below the hydrogenation temperature and the total amount of hydrogen supplied contains at least 40%, preferably 80 to 100% of the solvent which at the particular pressure and temperature may be contained in the hydrogen in vapor form. It is also advantageous to recycle some of the reaction mixture.

The diaminodicyclo alkanes or ethers are recovered from the reaction mixture by fractional distillation.

Diaminodicycloalkanes or ethers obtained according to the process of this invention are valuable intermediates for the manufacture of high molecular weight compounds as stated in U.S. Pat. 2,606,928.

The invention is further illustrated by the following examples in which the parts are parts by weight unless otherwise specified. Parts by weight bear the same relation to parts by volume as the kilogram to the liter (S.T.P.).

EXAMPLE 1

840 parts of diaminodiphenylmethane comprising approx. 95 wt. percent of 4,4'-isomers and 5 wt. percent of 2,2'- and 2,4'-isomers, 400 parts of tetrahydrofuran and 100 parts of cobalt oxide are placed in a pressure reactor of corrosion-resistant steel. The autoclave is closed and swept with nitrogen. Hydrogenation is carried out for 8 hours at 195 to 205° C. and 300 atm. gauge of hydrogen, the pressure being adjusted to 300 atm. at 30-minute intervals. The reactor is cooled and emptied. The catalyst is separated from the reaction mixture by filtration and washed with a little tetrahydrofuran. The solutions are combined and fractionally distilled. 700 parts of 4,4'-diaminodicyclohexylmethane, B.P. 126° C./0.3 mm., is obtained which solidifies at 39.6° C. The yield is 86.5% of the theory.

EXAMPLE 2

1.0 part by volume of a cobalt catalyst comprising 30 wt. percent of cobalt oxide supported on pumice (particle size 3 to 5 mm.) is charged into a vertical high-pressure reactor. The catalyst is reduced with hydrogen for 60 hours at 320° C. at atmospheric pressure, the water formed being run off. Then 0.15 part by volume per hour of a liquid mixture of 30 wt. percent of diaminodiphenylmethane and 70 wt. percent of tetrahydrofuran is metered into the reactor, the temperature in the reactor being kept at 200 to 220° C. and the pressure at 300 atm. gauge with hydrogen. The reaction mixture is discharged at the bottom of the reactor via a pressure separator. The product is worked up by distillation. 263 parts of diaminodicyclohexylmethane, B.P. 127° C./0.3 mm., is obtained from 1,000 parts of reaction mixture. The yield is 83.8% of the theory.

EXAMPLE 3

1.0 part by volume of a catalyst comprising 30 wt. percent of cobalt oxide supported on pumice is charged into a vertical high-pressure tube. Then 0.150 part by volume of a mixture of 30 wt. percent of 4,4'-diaminodiphenylmethane and 70 wt. percent of tetrahydrofuran as well as 1500 parts by volume of hydrogen are pumped in per hour, the reaction conditions being 200 to 230° C. and 300 atm. gauge. The reaction mixture is discharged at the lower end of the reactor and separated from excess hydrogen in a separator. The hydrogen saturated with tetrahydrofuran is combined with fresh hydrogen and recycled to the high-pressure tube. 860 parts (86.0% of the theory) of 4,4'-diaminodicyclohexylmethane, B.P. 128° C./0.3 mm., is obtained by fractional distillation from 1000 parts of reaction mixture which has been freed from solvent.

EXAMPLE 4

1.0 part by volume of a catalyst comprising 25 wt. percent of cobalt oxide supported on pumice is charged into a vertical high-pressure tube. The catalyst is reduced with hydrogen for 60 hours at 320 to 340° C. at atmospheric pressure. Then 0.150 part by volume per hour of a mixture of 30 wt. percent of 4,4'-diamino-3,3'-dimethyldiphenylmethane and 70 wt. percent of N,N-dimethylcyclohexylamine as well as 150 parts by volume (S.T.P.) of hydrogen are metered into the top portion of the high-pressure tube, the reaction conditions being 220 to 225° C. and 300 atmospheres gauge. The reaction mixture is discharged at the lower end of the tube and separated from excess hydrogen in a separator. The hydogen saturated with N,N-dimethylcyclohexylamine is combined with fresh hydrogen and recycled to the high-pressure tube. 690 parts of N,N-dimethylcyclohexylamine and 310 parts of crude 4,4'-diamino-3,3-dimethyldicyclohexylmethane, B.P. 144° C./0.3 mm., are obtained from 1000 parts of reaction mixture by fractional distillation. The crude mixture comprises 87 wt. percent of 4,4'-diamino-3,3'-dicyclohexylmethane, 10 wt. percent of 4,4'-diamino-3,3'-dimethylphenylcyclohexylmethane and 2 wt. percent of a non-distillable residue. The 4,4'-diamino-3,3'-dimethylphenylcyclohexylmethane is recycled to the hydrogenation stage. The yield, based on 4,4'-diamino-3,3'-dimethyldiphenylmethane, is 97% of the theory.

EXAMPLE 5

1.0 part by volume of a catalyst comprising 30 wt. percent of cobalt and 6 wt. percent of manganese in the form of their oxides supported on pumice is charged into a vertical high-pressure tube. The catalyst is reduced with hydrogen for 60 hours at 320 to 340° C. at atmospheric pressure. Then 0.0150 part by volume per hour of a mixture of 30 wt. percent of 4,4'-diamino-3,3'-dimethyldiphenylmethane and 70 wt. percent of tetrahydrofuran as well as 150 parts by volume (S.T.P.) of hydrogen are metered into the top portion of the high-pressure tube, the reaction conditions being 220 to 225° C. and 300 atmospheres gauge total pressure. The reaction mixture and the hydrogen are discharged at the bottom of the reactor via a separator. The hydrogen saturated with tetrahydrofuran is combined with fresh hydrogen and recycled to the reactor.

After a 10-day run the reaction mixture freed from tetrahydrofuran contains

| | Percent |
|---|---|
| Low-boiling first runnings | 0.2 |
| 4,4' - diamino - 3,3' - dimethyldicyclohexylmethane, B.P. 145° C./0.4 mm. (=95% of the theory) | 95.0 |
| 4,4' - diamino - 3,3' - dimethyldicyclohexylphenylmethane | 3.0 |
| Residue (less than) | 1.0 |

After a 30-day run the following fractions are obtained:

| | Percent |
|---|---|
| Low-boiling first runnings | 1 |
| 4,4' - diamino - 3,3' - dimethyldicyclohexylmethane, B.P. 145° C./4 mm. (=94% of the theory) | 94 |
| 4,4' - diamino - 3,3' - dimethyldicyclohexylphenylmethane | 4 |
| Residue | 1 |

After a 75-day run the following fractions are obtained:

| | Percent |
|---|---|
| Low-boiling first runnings | 2 |
| 4,4' - diamino - 3,3' - dimethyldicyclohexylmethane, B.P. 145° C./4 mm. (=92% of the theory) | 92 |
| 4,4' - diamino - 3,3' - dimethyldicyclohexylphenylmethane | 4 |
| Residue | 2 |

After a 90-day run the following fractions are obtained:

| | Percent |
|---|---|
| Low-boiling first runnings | 3 |
| 4,4' - diamino - 3,3' - dimethyldicyclohexylmethane, B.P. 145° C./4 mm. (=91% of the theory) | 92 |
| 4,4' - diamino - 3,3' - dimethyldicyclohexylphenylmethane | 3 |
| Residue | 3 |

If the catalyst used for the hydrogenation does not contain manganese in addition to cobalt, the yield of 4,4'-diamino-3,3'-dimethyldicyclohexylmethane after a 90-day run drops to 80% of the theory.

We claim:

1. A process for the hydrogenation of diaminodiphenyl alkanes or ethers to produce diaminodicyclohexyl alkanes or ethers having the general formula

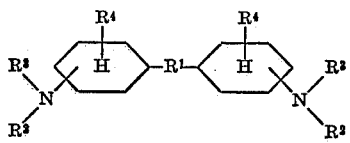

by contacting diaminodiphenyl alkanes or ethers having the general formula

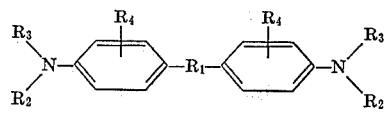

wherein in each of the formulae $R^1$ is an alkylene or alkylidene radical having from 1 to 4 carbon atoms or an oxygen atom, $R^2$ and $R^3$ are hydrogen atoms or alkyl radicals having from 1 to 4 carbon atoms, and $R^4$ is a hydrogen atom, an alkyl radical having from 1 to 12 carbon atoms, a halogen atom or an alkoxy radical which contains 1–4 carbon atoms with hydrogen in the presence of a hydrogenation catalyst and in an inert solvent at temperatures of 130 to 300° C. and pressures of 150 to 700 atmospheres gauge in the absence of alkaline earth metal oxides, and using as the inert solvent a cyclic ether having one oxygen atom and from 4 to 8 carbon atoms both in the molecule and in the ring, cyclohexylamine or an N-alklated cyclohexylamine in concentrations of from 30 to 90% by weight based on the total of solvent and diaminodiphenyl alkane or ether to be hydrogenated, wherein the improvement comprises using as the hydrogenation catalyst a catalytic composition containing 15 to 95% by weight of cobalt and 1 to 20% by weight of manganese, based on the metal content of the catalyst.

2. A process as claimed in claim 1 wherein diaminodiphenylmethane or diaminodiphenylpropane-(2,2) is used as starting material.

3. A process as claim in claim 1 wherein temperatures of 180 to 250° C. are used.

4. A process as claimed in claim 1 wherein pressures of 200 to 350 atmospheres are used.

5. A process as claimed in claim 1 wherein cyclic ethers having a five- to seven-membered ring are used as inert solvents.

6. A process as claimed in claim 1 wherein said inert solvents are used in concentrations of from 60 to 80% by weight based on the total of solvent and compound to be hydrogenated.

7. A process as claimed in claim 1 wherein the inert solvents used are N-alkylated cyclohexylamines containing alkyl groups with 1 to 4 carbon atoms on the nitrogen atom.

References Cited

UNITED STATES PATENTS

| 2,413,598 | 12/1946 | Ballard et al. | 260—578X |
| 2,606,927 | 8/1952 | Barkdoll et al. | 260—563 |
| 3,117,992 | 11/1964 | Duggan | 260—563 |
| 3,153,088 | 10/1964 | Arthur | 260—563 |
| 3,155,724 | 11/1964 | Arthur | 260—563 |
| 3,347,917 | 10/1967 | Arthur | 260—563 |

FOREIGN PATENTS

| 842,200 | 6/1952 | Germany | 260—563 |

ROBERT V. HINES, Primary Examiner

U.S. Cl. X.R.

252—454, 461, 470, 471; 260—570, 570.5, 571, 576